United States Patent Office 3,708,277
Patented Jan. 2, 1973

3,708,277
HERBICIDAL METHOD
Adolf Zeidler, Ludwigshafen (Rhine), Adolf Fisher, Mutterstadt, Pfalz, and Guenther Weiss, Ludwigshafen (Rhine), Germany, assignors to Badische Anilin- & Soda-Fabrik Aktiengesellschaft, Ludwigshafen (Rhine), Germany
No Drawing. Original application Aug. 17, 1967, Ser. No. 661,232. Divided and this application Jan. 27, 1970, Ser. No. 10,102
Claims priority, appplication Germany, Aug. 30, 1966, P 15 42 836.1
Int. Cl. A01n 9/22
U.S. Cl. 71—91    4 Claims

ABSTRACT OF THE DISCLOSURE

Diazinone dioxides and a method of controlling unwanted plants.

---

The present invention relates to thiadiazinone dioxides, in particular benzothiadiazinone dioxides, and a method for controlling unwanted plants with said compounds.

It is known that 2-methyl-4-chlorophenoxyacetic acid and its salts, in particular the potassium salt, may be used as herbicides. It is also known that 2-chloro-4,6-bis-(ethylamino)-s-triazine may be used as a herbicide. However, the action of these substances is not satisfactory.

An object of this invention is to provide new valuable benzothiadiazinone dioxides which have a good herbicidal action. Another object of the invention is to provide a method of controlling unwanted plants with benzothiadiazinone dioxides whereby the crop plants are not damaged or all the plants on a specific area are killed.

The present application is a division of application Ser. No. 661,232, which was filed on Aug. 17, 1967 now abandoned.

These and other objects of the invention are achieved with benzo-2-thia-1,3-diazinone-(4)-2,2-dioxides having the formula

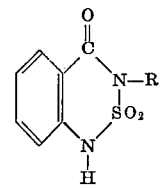

in which R denotes a lower aliphatic radical or a cycloalkyl radical, or the salts of these compounds.

Examples of the active compounds according to the invention are 3-methyl-, 3-ethyl-, 3-n-propyl-, 3-isopropyl-, 3-n-butyl-, 3-iso-butyl- and 3-cyclohexylbenzo-2-thia-1,3-diazinone-(4)-2,2-dioxide. Examples of the salts are the alkali metal, alkaline earth metal, ammonium, hydroxyalkyl and alkylammonium salts, e.g. the sodium, potassium, calcium, methylammonium, trimethylammonium, ethylammonium, diethanolammonium or ethanolammonium salts.

The active compounds to be used according to this invention are new. They may be simply prepared by cyclization of N-alkyl-N'-o-carboxyphenyl sulfamides or N-alkyl-N'-o-carboalkoxyphenyl sulfamides with condensing agents. Examples of condensing agents are phosphorus oxychloride, thionyl chloride and aqueous or alcoholic alkaline solutions. The salts are obtained by reacting the thiadiazinone dioxides with alkaline compounds. Since all the compounds to be used according to the invention may be prepared by analogous methods, the preparation of 3-propylbenzo-2-thia-1,3-diazinone-(4)-2,2-dioxide is described in detail below.

3-propylbenzo-2-thia-1,3-diazinone-(4)-2,2-dioxide 27.2 parts (by weight) of N-propyl-N'-o-carbomethoxyphenyl sulfamide is dissolved in 200 parts of methanol. After 100 parts of a 10% (by weight) aqueous caustic soda solution has been added, the whole is brought quickly to the boil and the hot solution is acidified to a pH of 1 with concentrated hydrochloric acid. After the whole has been allowed to cool, 22.8 parts of 3-propylbenzo-2-thia-1,3-diazinone-(4)-2,2-dioxide is obtained in the form of white crystals having a melting point of 191° to 192° C. and in a yield of 95% of the theory. The substance requires no further purification. By reaction with the equivalent amount of caustic soda solution an aqueous solution of the sodium salt of this compound is obtained.

The compounds to be used according to the invention are colorless crystalline substances.

The following are examples of substances to be used according to the invention:

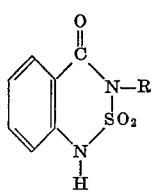

| R | M.P. (° C.) |
|---|---|
| CH₃ | 207 |
| C₂H₅ | 181 |
| n-C₃H₇ | 191–192 |
| —CH(CH₃)₂ |  |
| n-C₄H₉ | 124 |
| —CH₂—CH(CH₃)₂ | 153–154 |
| cyclohexyl (H) | 158–159 |

The herbicides according to the invention may be used as solutions, emulsions, suspensions or dusts. The form of application depends entirely on the purpose for which the agents are being used; in any case it should ensure a fine distribution of the active ingredient. They are prepared by mixing the active ingredient with a solid or liquid carrier, for example clay, diatomite, water, hydrocarbons or dispersing or wetting agents.

Aqueous formulations may be prepared from emulsion concentrates, pastes or wettable powders (spray powders) by adding water or by dissolving the readily water-soluble alkali metal, alkaline earth metal, ammonium, hydroxyl or alkylammonium salts in water.

The following comparative experiments show the superiority of the new herbicides over known active ingredients.

EXAMPLE 1

In a greenhouse the plants Indian corn (*Zea mays*), barley (*Hordeum vulgare*), wheat (*Triticum vulgare*), crane's bill (*Geranium dissectum*), small nettle (*Urtica urens*), amaranth pigweed (*Amaranthus retroflexus*), lady's thumb (*Polygonum persicaria*), white goosefoot (*Chenopodium album*), garden sorrel (*Rumex acetosa*) and chamomile (*Matricaria chamomilla*) were treated at a growth height of 2 to 15 cm. with 3-propylbenzo-2-thia-1,3-diazinone-(4)-2,2-dioxide (1), the sodium salt of this compound (II) and, for comparison, with the potassium salt of 2-methyl-4-chlorophenoxyacetic acid (III). The rate of application in each case was 2 kg. of active ingredient per hectare dispersed or dissolved in 500 liters of water. The results of the experiment can be seen from the following table.

|  | Active ingredient | | |
|---|---|---|---|
|  | I | II | III |
| Crop plants: |  |  |  |
| Indian corn | 0 | 0 | 30 |
| Barley | 0 | 0 | 5 |
| Wheat | 5 | 5 | 10 |
| Unwanted plants: |  |  |  |
| Crane's bill | 80 | 80 | 60 |
| Small nettle | 100 | 100 | 90–100 |
| Amaranth pigweed | 90 | 90 | 80 |
| Lady's thumb | 90 | 90 | 80 |
| White goosefoot | 100 | 100 | 90–100 |
| Garden sorrel | 90–100 | 90–100 | 70–80 |
| Chamomile | 100 | 100 | 20–30 |

NOTE.—0=no injury; 100=complete kill.

EXAMPLE 2

An agricultural plot on which crane's bill (*Geranium dissectum*), small nettle (*Urtica urens*), amaranth pigweed (*Amaranthus retrofleus*), lady's thumb (*Polygonum persicaria*), white goosefoot (*Chenopodium album*), garden sorrel (*Rumex acetosa*) and chamomile (*Matricaria chamomilla*) were growing was treated at a growth height of the plants of 4 to 7 cm. with 3-propyl-benzo--2-thia-1,3-diazinone-(4)-2,2-dioxide (I), the potassium salt of this compound (II) and, for comparison, with 2-chloro-4,6-bis-(ethylamino)s-triazine (III). The rate of application in each case was 5 kg. of active ingredient per hectare dispersed or dissolved in 500 liters of water.

After one to two days the plants treated with I and II began to wither and after six to eight days they had all withered, whereas it was two to three weeks before the plants treated with III had withered. Cereals, beet and cabbage were sown in the soil which had been treated with I and II and grew normally, whereas cereals, beet and cabbage sown in the soil treated with III were substantially injured or withered completely.

The following compounds have the same biological action as I and II in Examples 1 and 2:

3-methylbenzo-2-thia-1,3-diazinone-(4)-2,2-dioxide and the sodium salt thereof 3-ethylbenzo-2-thia-1,3-diazinone-(4)-2,2-dioxide 3-isopropylbenzo-2-thia-1,3-diazinone-(4)-2,2-dioxide and the diethanolammonium salt thereof 3-n-butylbenzo-2-thia-1,3-diazinone-(4)-2,2-dioxide and the calcium salt thereof 3-isobutylbenzo-2-thia-1,3-diazinone-(4)-2,2-dioxide and the trimethylammonium salt thereof 3-cyclohexylbenzo-2-thia-1,3-diazinone-(4)-2,2-dioxide.

We claim:

1. A method of controlling unwanted plant growth which comprises treating the plants or the soil in which the plants are growing or are to be grown with a phytotoxic amount of the compound of the formula

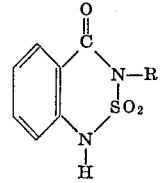

or its salts selected from the group consisting of the alkali metal, alkaline earth metal, ammonium, hydroxyalkylammonium and alkylammonium salts, wherein R is lower alkyl or cyclohexyl.

2. A method as claimed in claim 1 wherein R of said formula is isopropyl.

3. A method as claimed in claim 1 wherein said compound is 3-isopropylbenzo-2-thia-1,3-diazinone-(4)-2,2-dioxide.

4. A method as claimed in claim 1 wherein said compound is the diethanolammonium salt of 3-isopropylbenzo-2-thia-1,3-diazinone-(4)-2,2-dioxide.

References Cited

UNITED STATES PATENTS 3,407,198   10/1968   Wright _____ 71—91 X
3,041,336   6/1962   Teufel _____ 260—243

LEWIS GOTTS, Primary Examiner

C. L. MILLS, Assistant Examiner

U.S. Cl. X.R.

260—243 A

UNITED STATES PATENT OFFICE
CERTIFICATE OF CORRECTION

Patent No. 3,708,277  Dated January 2, 1973

Inventor(s) Adolf Zeidler, Adolf Fischer, Guenther Weiss

It is certified that error appears in the above-identified patent and that said Letters Patent are hereby corrected as shown below:

Inventor Adolf Fisher should be -- Adolf Fischer --

Signed and sealed this 12th day of March 1974.

(SEAL)
Attest:

EDWARD M. FLETCHER, JR.  C. MARSHALL DANN
Attesting Officer  Commissioner of Patents